United States Patent [19]

Lucenko et al.

[11] Patent Number: 5,581,995
[45] Date of Patent: Dec. 10, 1996

[54] METHOD AND APPARATUS FOR DETECTING BURNER BLOWOUT

[75] Inventors: Michael Lucenko, Glastonbury; Ruurd E. Vanderleest, Vernon; Kenneth J. St. Onge, West Hartford, all of Conn.

[73] Assignee: United Technologies Corporation, Hartford, Conn.

[21] Appl. No.: 404,474

[22] Filed: Mar. 14, 1995

[51] Int. Cl.$^6$ ............................................. F02C 9/00
[52] U.S. Cl. .................................. 60/39.02; 60/39.091
[58] Field of Search ............................ 60/39.02, 39.06, 60/39.091, 39.13, 223

[56] References Cited

U.S. PATENT DOCUMENTS

| | | | |
|---|---|---|---|
| 3,805,517 | 4/1974 | Sewell et al. | 60/39.091 |
| 3,830,055 | 8/1974 | Erlund | 60/39.091 |
| 4,597,259 | 7/1986 | Moore et al. | 60/39.091 |
| 5,170,621 | 12/1992 | Barnum et al. | 60/39.091 |
| 5,235,802 | 8/1993 | Barnum et al. | 60/39.02 |

*Primary Examiner*—Michael Koczo

[57] ABSTRACT

A gas turbine power plant for producing electricity includes a gas turbine engine having a burner receiving a fuel flow and compressed air. The burner provides ignition of said fuel flow to produce a jet exhaust for propelling a power turbine. The power turbine has a rotatable turbine shaft adapted to drive a generator. During operation of the power plant various conditions can cause the burner not to ignite the fuel flow, known as burner blowout. Burner blowout results in unburned fuel flowing downstream to the detriment of the power plant. The gas turbine power plant of the present invention incorporates a method and apparatus for detecting burner blowout and limiting the consequences of blowout for the power plant.

18 Claims, 2 Drawing Sheets

METHOD AND APPARATUS FOR DETECTING BURNER BLOWOUT

TECHNICAL FIELD

The present invention relates to gas turbine power plants and, more particularly, to a method and an apparatus for detecting burner blowout in gas turbine power plants.

BACKGROUND OF THE INVENTION

Gas turbine power plants for generating electricity are well known in the art and typically utilize a gas turbine engine, a fuel system, a power turbine, a generator and an engine control. Conventional gas turbine engines of the type typically used in gas turbine power plants include a low pressure rotor comprised of a low pressure compressor directly connected by a first shaft to a downstream low pressure turbine. In addition, the gas turbine engine has a high pressure rotor disposed between the low pressure compressor and the low pressure turbine. The high pressure rotor is comprised of a high pressure compressor directly connected by a second shaft to a downstream high pressure turbine. Further, the gas turbine engine includes a burner, which is disposed between the high pressure compressor and the high pressure turbine. The burner receives compressed air and a fuel flow from the fuel system.

The fuel system includes a first fuel supply line between the fuel supply and a fuel valve, and a second fuel supply line from the fuel valve to the burner. The fuel flow is modulated by the fuel valve or control/shutoff/trip/flow valve, which is driven by an actuator. An injection device introduces water or steam along with the fuel into the burner. The fuel used may be liquid fuel, gaseous fuel or a combination of the two.

The gas turbine power plants further have the power turbine located downstream of the gas turbine engine. The power turbine has a power turbine shaft adapted to fixedly engage a generator shaft. The generator shaft is connected to the generator. Typically, the power plants also include the engine control for measuring various parameters during operation and for adjusting performance of the system. Oftentimes, conventional power plants will also include a boiler for producing steam from water.

In operation, inlet air flows through the low and high compressors, thereby producing compressed air which flows to the burner. When the fuel valve is in the open position, fuel flows to the burner. In order to achieve increased power output and decrease emissions, in accordance with well-known gas turbine principles, the injection device introduces water or steam along with the fuel into the burner in response to the exit gas temperature between the low pressure compressor and the power turbine. The burner provides ignition of the fuel/air mixture causing a jet exhaust to be created. The jet exhaust flows downstream and passes through the two turbines driving the first and second shafts, which in turn causes the two compressors upstream to rotate. The rotation of the compressors supplies the burner with the necessary inlet air.

After the jet exhaust passes through the two turbines, the jet exhaust flows through the power turbine driving it, thereby producing mechanical energy. The mechanical energy is in the form of the rotation of the turbine shaft and the coupled generator shaft. The generator converts this mechanical energy into electrical energy. If the power plant has a boiler, the effluent from the power turbine is flowed to the boiler in a heat transfer relationship with water, consequently steam is produced.

One problem with gas turbine power plants is burner blowout which occurs when the burner fails to ignite the fuel/air mixture. As a result, unburned fuel enters the power plant downstream of the burner. Burner blowout occurs due to changes in the fuel/air ratio of the fuel/air mixture fed to the burner.

Firstly, the fuel/air ratio is dictated by the gas turbine engine design and varies somewhat through the load range and during transient phenomenon occurring in the power plant prior to reaching a steady-state condition. In the event that the fuel/air ratio decreases significantly, the mixture of fuel and air fed to the burner can be so lean that the burner is not supplied with enough fuel to maintain the ignition and a blowout occurs. In contrast, if the fuel/air ratio increases significantly, the mixture of fuel and air fed to the burner can be lacking sufficient air so that the burner cannot maintain the ignition and a blowout occurs.

Secondly, while the injection of water or steam has some positive impact on the power plant, the injection into the fuel changes the burner's sensitivity to the fuel/air ratio making the burner more unstable and more susceptible to blowout.

The most serious consequence of burner blowout may occur in power plants that have boilers which use the effluent from the power turbine. In these types of power plants, the introduction of unburned fuel into the boiler can lead to an explosion. This explosion occurs when the unburned fuel auto-ignites due to contact with the hot turbine parts and this ignited fuel causes unburned fuel which has accumulated in the boiler to ignite. Explosions have been observed to generally occur if blowout persists from about 0.00 seconds to about 0.4 seconds.

Thus, a method and apparatus are necessary for detecting burner blowout so that fuel flow to the burner can be stopped, thereby avoiding the consequences of introducing unburned fuel into the power plant. A method and apparatus designed to detect burner blowout is described in commonly-owned U.S. Pat. No. 5,235,802 and commonly-owned U.S. Pat. No. 5,170, 621, respectively. The method and apparatus disclosed in the aforementioned patents, address blowout detection by continuously monitoring a fuel demand signal and measuring a low pressure rotor speed, which is indicative of the actual airflow. A flame failure exists and fuel flow to the burner is stopped, if the fuel/air ratio exceeds certain pre-selected values. The pre-selected values vary depending on whether the operation is below or above idle.

Although the method and apparatus disclosed in U.S. Pat. Nos. 5,235,802 and 5,170,621 detect flame failure, these solutions may require too long a response time to minimize the consequences of burner blowout in all cases. As a result, scientists and engineers have been searching for a method and apparatus which will detect blowout with a shorter response time.

SUMMARY

According to the present invention, a method and an apparatus for detecting burner blowout are disclosed. The method is for detecting burner blowout in a gas turbine power plant of the type including a gas turbine engine having a burner receiving a fuel flow and compressed air. The burner is for providing ignition of the fuel flow to produce an actual pressure of ignition and a jet exhaust. The fuel flow being provided to the burner through a fuel valve when the valve is in an open position. The jet exhaust drives a rotatable generator shaft having an actual rotational speed. The generator shaft being connected to a generator.

The method comprising the following steps: periodically measuring the actual pressure of ignition at successive intervals of time; periodically measuring the actual rotational speed of the generator shaft at the successive intervals of time; calculating the rate of change in the actual pressure over a successive interval of time; calculating the rate of change in the actual rotational speed over the successive interval of time; comparing the magnitude of the rate of change in the actual pressure of ignition over the successive interval of time to the magnitude of a reference pressure rate of change value; comparing the magnitude of the rate of change in the actual rotational speed over the successive interval of time to the magnitude of a reference speed rate of change value; and closing the fuel valve in response to the magnitude of the reference pressure rate of change greater value being than the rate of change of the actual pressure of ignition over the successive interval of time, in the presence of the magnitude of the rate of change of actual rotational speed over the successive interval of time being less than the magnitude of the reference speed rate of change value, thus stopping the fuel flow to the burner. Further disclosed is a method for operating a gas turbine engine which detects burner blowout.

Also disclosed is an engine control for detecting burner blowout in a gas turbine power plant. The engine control comprises memory means for storing a reference pressure rate of change signal and a reference speed rate of change signal; and signal processing means for storing a plurality of signals representative of a blowout detection algorithm. The signal processing means being responsive to the sensed speed signal and to the sensed pressure signal to provide a pressure derivative signal indicative of the rate of change in the sensed pressure signal over a successive interval of time; a speed derivative signal indicative of the rate of change in the sensed speed signal over the successive interval of time; and a command signal to the fuel valve closing the fuel valve. The command signal is provided in response to the magnitude of the reference pressure rate of change signal being greater than the magnitude of the pressure derivative signal in the presence of the magnitude of the speed rate of change derivative signal being less than the magnitude of the reference speed rate of change signal, thus stopping the fuel flow to the burner.

Further disclosed is an assembly able to detect burner blowout. The assembly is for use with a generator, and the assembly comprises a power turbine, a gas turbine engine, a fuel system and an engine control. Also disclosed is a gas turbine power plant able to detect burner blowout. The gas turbine power plant comprises a generator, a speed sensor, a gas turbine engine, a fuel system and an engine control.

The foregoing invention will become more apparent in the following detailed description of the best mode for carrying out the invention and in the accompanying drawing.

BEST MODE FOR CARRYING OUT THE INVENTION

Figure 1:
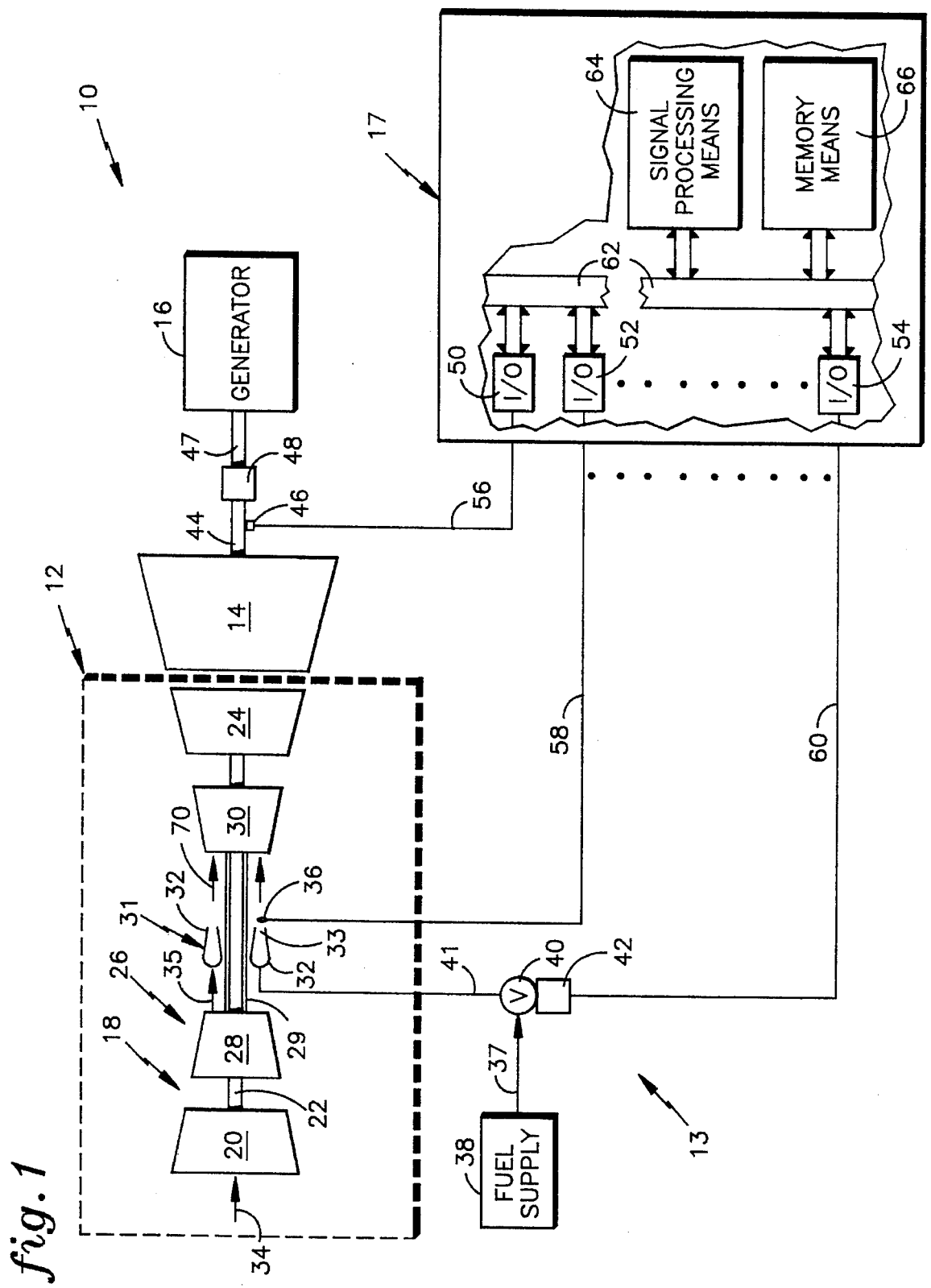
FIG. 1 is a schematic simplified of a gas turbine power plant of the type in which the present invention may be used.

FIG. 1 is a simplified schematic of a gas turbine power plant 10 of the type in which the present invention may be used. The gas turbine power plant 10 for generating electricity includes a gas turbine engine 12, a fuel system 13, a power turbine 14, a generator 16, and an engine control 17. The gas turbine engine 12 has a low pressure rotor 18 comprised of a low pressure compressor 20 directly connected by a first shaft 22 to a downstream low pressure turbine 24. In addition, the gas turbine engine 12 has a high pressure rotor 26 disposed between the low pressure compressor 20 and the low pressure turbine 24. The high pressure rotor 26 is comprised of a high pressure compressor 28 directly connected by a second shaft 29 to a downstream high pressure turbine 30. The second shaft extends through the first shaft, which is partially hollow. Further, a burner 31 is disposed between the high pressure compressor 28 and the high pressure turbine 30. The burner is annular and circumferentially surrounds the shafts 22 and 29. The burner has a plurality of combustors, represented by the combustor 32. Each combustor has an outlet 33. The gas turbine engine further includes a pressure sensor 36 disposed in close proximity to the outlet 33 of one of the combustors. The pressure sensor provides a sensed pressure signal indicative of the actual pressure of ignition at successive intervals of time.

In alternate embodiments the gas turbine engine may be a single spool type, thus having only a single rotor, or multiple spool type. The gas turbine engine may also have a burner which is a combustion chamber, where the combustion chamber has the pressure sensor located in close proximity to the outlet.

The gas turbine engine receives inlet air 34. The burner receives compressed air 35 and fuel flow (not shown) from the fuel system 13. The fuel system includes a first fuel supply line 37 between the fuel supply 38 and fuel valve 40, and a second fuel supply line 41 from the fuel valve to the burner 31. The fuel valve 40 is driven by an actuator 42. An injection device (not shown) introduces water or steam along with the fuel into the burner.

The power turbine 14 located downstream of the gas turbine engine 12 has a rotatable turbine shaft 44. In this embodiment the power turbine also has a speed sensor 46 for providing a sensed speed signal indicative of the actual rotational speed of the turbine shaft 44 at the successive intervals of time.

The generator 16 has a rotatable generator shaft 47. The device 48 is a conventional coupling for adapting the turbine shaft to fixedly engage the generator shaft. In an embodiment the power plant may be of the direct drive type where there is no power turbine and the generator shaft is connected directly to the low and/or high pressure turbine of the gas turbine engine. In the case of a direct drive type of power plant, the speed sensor would sense the actual rotational speed of the generator shaft. If the power plant is of the non-direct drive type having a power turbine and power turbine shaft, the speed sensor may sense the actual rotational speed of the generator shaft from the actual rotational speed of the generator shaft, the actual rotation speed of the turbine shaft or any other component from which this value can be derived.

The power plant further includes the engine control 17 (broken away for clarity). The engine control has a number of input/output buffers, of which the speed input/output buffer 50, the pressure input/output buffer 52 and the actuator input/output buffer 54 are shown. The speed input/output buffer 50 is connected to receive the sensed speed signal from the speed sensor 46 through line 56. The pressure input/output buffer 52 is connected to receive the sensed pressure signal from the pressure sensor 36 through line 58. The actuator input/output buffer 54 is connected to deliver a command signal to the actuator 42 through line 60. Each of the input/output buffers 50, 52 and 54 are connected to a data bus 62. These connections are represented by the double-headed arrows between the input/output buffers and the data bus. The engine control also includes signal processing means 64 and memory means 66. The signal processing means stores signals representative of a blowout algorithm. The memory means stores other signals.

An assembly means the combination of the gas turbine engine, power turbine, fuel system and engine control. The assembly would be for use with the generator. Often times, these power plants will also include a boiler (not shown) for producing steam from water. Some power plants also have waste heat steam generators (not shown) for receiving exit gas flow from the gas turbine for generation of additional power.

In operation, inlet air 34 flows through the compressors 20 and 28 to become the compressed air 35, which is flowed to the burner 31. The fuel valve 40 is in the open position so fuel flows from the fuel supply 38 through the first and second fuel lines 37 and 41 to the burner 31. The burner 31, through the combustors :32, ignites the fuel/air mixture causing jet exhaust 70 to be created at the outlet 33. The burner also produces a pressure of ignition which is sensed by the pressure sensor 36 at successive intervals of time. The pressure sensor provides the sensed pressure signal to the pressure input/output buffer 52 through line 58. The jet exhaust flows downstream and passes through the two turbines 30 and 24 driving the first and second shafts 22 and 29. The rotation of the shafts in turn cause the two compressors 28 and 20 upstream to rotate. The rotation of the compressors 28 and 20 supplies the burner with the necessary inlet air 34.

After the jet exhaust passes through the two turbines, the jet exhaust flows through the power turbine 14 driving it, thus, rotating the turbine shaft 44 and through the coupling 48, also rotating the generator shaft 47. The speed sensor 46 senses the actual rotational speed of the turbine shaft and consequently the generator shaft at successive intervals of time, and the speed sensor provides the sensed speed signal to the speed input/output buffer 50 through the line 56. The signal processing means 64, through the data bus 62, receives the sensed pressure signal and the sensed speed signal. The signal processing means further receives the reference pressure and speed rate of change signals from the memory means 66 through the data bus 62.

The signal processing means provides a pressure derivative signal indicative of the rate of change in the sensed pressure signal over a successive interval of time. The signal processing means also provides a speed derivative signal indicative of the rate of change in the sensed speed signal over the successive interval of time. Further, the signal processing means provides the command signal to the acuator 42 through the line 60 in response to the magnitude of the reference pressure rate of change greater signal being than the pressure derivative signal in the presence of the magnitude of the speed derivative signal being less than the magnitude of the reference speed rate of change signal. Thus, the actuator closes the fuel valve 40, stopping said fuel flow to the burner.

In an alternate embodiment, the signal processing means can provide the command signal if the magnitude of the reference pressure rate of change signal is greater than the magnitude of the pressure derivative signal over a subsequent interval of time.

Figure 2:
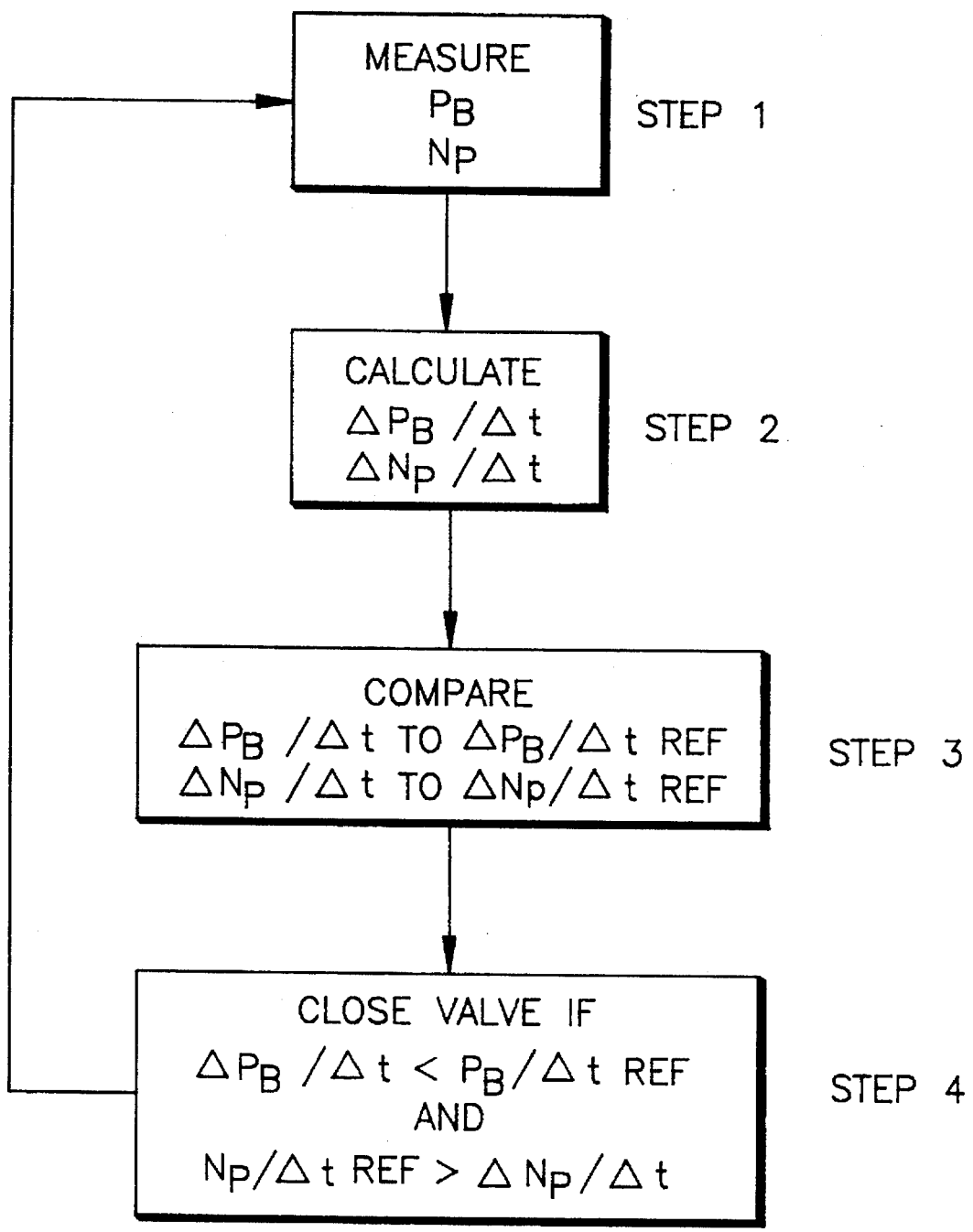
FIG. 2 is a flowchart of the burner blowout detection method of the present invention.

Referring to FIG. 2, a flowchart of the burner blowout detection method of the present invention. The method includes the steps of measuring the actual pressure of ignition ($P_B$) and the actual speed of the turbine shaft ($N_P$) at successive intervals of time; calculating a rate of change of the actual pressure over a successive interval of time ($\Delta P_B/\Delta t$) and a rate of change of the actual speed at the successive interval of time ($\Delta N_P/\Delta t$), also known calculating derivatives or rates of decay; comparing the respective rates of change to a reference pressure rate of change value ($\Delta P_B/\Delta t$ REF) and a reference speed rate of change value ($\Delta N_P \Delta t$ REF and closing the fuel if the rate of change of the actual pressure over the successive interval of time ($\Delta P_B/\Delta t$) is less than the reference pressure rate of change ($\Delta P_B/\Delta t$ REF) and the reference speed rate of change value ($\Delta N_P/\Delta t$ REF) is greater than the rate of change of the actual speed over the successive interval of time ($\Delta N_P/\Delta t$).

Turning to the first step of measuring, refer to FIGS. 2, the burner pressure ($P_B$) must be periodically measured at the outlet 33 at successive intervals of time. The power turbine speed ($N_P$) is measured, in this embodiment, at the turbine shaft 44 at successive intervals of time (i.e., at a first time and at successive times after that). In operation, the burner establishes the actual pressure ($P_B$) at its outlet by igniting the fuel/air mixture. The actual pressure is measured with a pressure sensor 36. The power turbine establishes a turbine speed ($N_P$) which is measured by a speed sensor 46.

The pressure and the speed sensors can be any device which converts a physical quantity (i.e., pressure or speed) into a quantifiable electrical signal (i.e., sensed pressure signal or sensed speed signal). Such devices are already a part of conventional power plants, since the pressure is customarily used to check the engine for deterioration or compressor surge, and the speed is customarily used to control operation of the power plant and check the health of the power plant.

The preferred pressure sensor is a two wire device which is commercially available and manufactured by Statham under the model #37PA-500-42-12-XX-XX-01-02. This device is preferred because of its accuracy and industrial quality. The preferred speed sensor is a magnetic pickup which is commercially available and manufactured by Electro Corp. under the name Magnetic Sensor (model #724718). This device is preferred because of its accuracy, industrial quality and availability.

Now looking at the second step of calculating rate of change of the actual pressure over a successive interval of time ($\Delta P_B/\Delta t$), and the rate of change of the actual speed over the successive interval of time ($\Delta N_P/\Delta t$). There are many conventional math algorithms for calculating rates of change, any of which can be used. The rate of change in the actual pressure of ignition and the rate of change in the actual rotational speed can be calculated using the signal processing means 64 which contains the blowout detection algorithm for such a function.

The successive interval of time over which the signal processing means continuously calculates the rates of change is an interval defined by the successive intervals of time at which the pressure and speed are periodically measured. For example, if the pressure and speed are periodically measured at a first time of $t_1$ and a second time of $t_2$, the successive interval over which the rates are measured will be from $t_1$ to $t_2$. This periodical measurement and rate calculating continues successively.

In this embodiment the successive interval of time over which the rate of change of the actual pressure and the actual rotational speed is about 0.01 seconds. Experiments determined that blowout detectors have about 0.4 seconds to catch a blowout before consequences are felt by the power plant. Thus, the successive time interval over which rate is calculated and the signal processing means used must be fast enough to calculate rates of change within the 0.4 second window. Other devices that can be used to calculate the rates of change include microprocessors and program digital computers.

The third step in the method is to compare the magnitude of rate of change of actual pressure over the successive interval of time ($\Delta P_B/\Delta t$) to the magnitude of the reference pressure rate of change value ($\Delta P_B/\Delta t$ REF) and to compare the magnitude of the rate of change of the actual speed over the successive interval of time ($\Delta N_P/\Delta t$) to the magnitude of the reference speed rate of change value ($\Delta N_P/\Delta t$) REF). This function can be performed by the signal processing means via the blowout detection algorithm.

The fourth step in the method is to close the fuel valve in response to the magnitude of the rate of change of the actual pressure value over the successive interval of time being less than the magnitude of the reference pressure rate of change value in the presence of the magnitude of the reference speed rate of change value being greater than the magnitude of the rate of change in the actual speed over the successive interval of time.

The reference pressure and the reference speed rate of change values are rates of change which were determined experimentally to be about −50 psi/sec and 25 rpm/sec, respectively. Although constant values are used in the present method, a schedule can be used which plots rate of change in the associated parameter versus the associated parameter then compare the curve values to the rate of change value from the measured parameters.

An additional method step (not shown) can be included in the step of closing the fuel valve. The additional step is to determine prior to closing the fuel valve that the magnitude of the reference pressure rate of change value is greater than the magnitude of the rate of change of the actual pressure over a subsequent interval of time. The subsequent interval of time is an interval of time after the successive intervals of time at which the first rate of change in the actual pressure was taken. This insures that the closing of the fuel valve will not occur as a result of an engine anomaly, but requires that the first condition of blowout (i.e., $\Delta P_B/\Delta t$ less than ($\Delta P_B/\Delta t$ REF) occur at least twice. The signal processing means via the blowout detection algorithm can provide this check by delaying closing the fuel valve a set delay time interval before declaring a blowout in order to receive an additional rate of change of actual pressure and to compare. In this embodiment, a delay time interval of 0.08 seconds is preferred because this interval is long enough to allow several passes and short enough to still be within the 0.4 second window. However, any time interval that allows at least two rates of pressure change to be compared to the reference pressure rate of change value can be used.

The principal advantage of this method and apparatus is that it is extremely fast reacting. A response time on the order of about 0.1 seconds can be achieved utilizing the present invention, as opposed to a response time of about 0.6 seconds with the fuel/air ratio detector. This decrease in response time is due to utilizing the burner pressure as one indication of blowout. Gas turbine engines want to work from the middle (i.e., the burner), outward. Since the burner is where the fuel enters and the energy to drive the engine is produced, the burner pressure is the first parameter in the engine to vary with a change in fuel flow. Thus, burner pressure is the fastest reacting parameter with which to determine blowout.

As a result of the decrease in the response time, the present invention is able to prevent re-ignition or auto-ignition of the unburned fuel by detecting blowout and closing the fuel valve quickly enough to prevent enough fuel accumulation within a boiler to explode. Recall re-ignition may occur if blowout persists for about 0.4 seconds Another advantage of the present invention is that it does not interfere with normal operation of the engine during power up, shutdown or drop load conditions. During power up, shutdown and drop load, the power turbine speed increases or decreases. A drop load occurs when the load carried by the power turbine is not transmitted to the generator, for example, when the turbine shaft, means for fixedly engaging or generator shaft breaks.

In the case of a drop load, the power turbine will want to speed up because the load (i.e., powering the generator) that normally adsorbs the power is gone. The power plant wants the speed to remain constant so when this increase in speed is sensed by the power plant, it cuts back the fuel in an effort to reduce the turbine speed. This fuel reduction would produce a change in actual pressure rate of change less than the reference pressure rate of change value, thus satisfying the first condition of blowout, even though there is no blowout. So, the second condition of blowout (i.e., speed comparison) checks to see if the reference speed rate of change value is greater than the reference speed rate of change value, which in the case of a drop load, is not the case, thus preventing closing the fuel valve when no blowout exists. Similar events occur during power up and shutdown. Preventing a blowout declaration in these normal operating situations prevents inadvertent shutdowns.

Several other advantages to the present invention are ease of programming and adjusting the burner pressure and power turbine speed limits due to using an algorithm; and the apparatus is inexpensive because some preexisting devices such as the sensors and the engine control are used.

While a particular invention has been described with reference to illustrated embodiment, this description is not meant to be construed in a limiting sense. It is understood that although the present invention has been described in a preferred embodiment, various modifications of the illustrative embodiments, as well as additional embodiments of the invention, will be apparent to persons skilled in the art upon reference of this description without departing from the spirit and scope of the invention, as recited in the claims appended hereto. It is therefore contemplated that the appended claims will cover any such modification or embodiments that fall within the true scope of the invention.

We claim:

1. A method, for detecting burner blowout in a gas turbine power plant of the type including a gas turbine engine having a burner receiving a fuel flow and compressed air, the burner for providing ignition of said fuel flow to produce an actual pressure of ignition and a jet exhaust driving a rotatable generator shaft, the fuel flow being provided to the burner through a fuel valve when the valve is in an open position, the generator shaft being connected to a generator, the generator shaft having an actual rotational speed, said method comprising the steps of:

periodically measuring the actual pressure of ignition at successive intervals of time;

periodically measuring the actual rotational speed of said generator shaft at said successive intervals of time;

calculating the rate of change in said actual pressure over a successive interval of time;

calculating the rate of change in said actual rotational speed over said successive interval of time;

comparing the magnitude of said rate of change in said actual pressure of ignition over said successive interval of time to the magnitude of a reference pressure rate of change value;

comparing the magnitude of said rate of change in said actual rotational speed over said successive interval of time to the magnitude of a reference speed rate of change value; and closing said fuel valve in response to the magnitude of said reference pressure rate of change value being greater than the rate of change of said actual pressure of ignition over said successive interval of time, in the presence of the magnitude of said rate of change of actual rotational speed over said successive interval of time being less than the magnitude of said reference speed rate of change value; thereby stopping said fuel flow to said burner.

2. The method of claim 1, wherein the step of closing said fuel valve further comprises the step of:

determining prior to closing said fuel valve that the magnitude of said reference pressure rate of change value is greater than the magnitude of the rate of change of said actual pressure over a subsequent interval of time.

3. The method of claim 1, wherein the power plant further comprises:

a power turbine interposed between the gas turbine engine and the generator, said power turbine having a rotatable turbine shaft adapted to fixedly engage the generator shaft, the jet exhaust propelling said power turbine, said power turbine driving the generator through the power turbine shaft and said generator shaft.

4. A method for operating a gas turbine power plant of the type including a gas turbine engine having a burner receiving a fuel flow and compressed air, the burner for providing ignition of said fuel flow to produce an actual pressure of ignition and a jet exhaust for propelling a power turbine, the fuel flow being provided to the burner through a fuel valve when the valve is in an open position, the power turbine having a rotatable turbine shaft adapted to fixedly engage a rotatable generator shaft, said generator shaft being connected to a generator, said generator shaft having an actual rotational speed, said method comprising the steps of:

providing ignition of said fuel flow to produce said jet exhaust;

generating said actual rotational speed in response to the presence of said jet exhaust;

periodically measuring said actual pressure of ignition at successive intervals of time;

periodically measuring the actual rotational speed at said successive intervals of time;

calculating the rate of change in said actual pressure of ignition over a successive interval of time;

calculating the rate of change in said actual rotational speed over said successive interval of time;

comparing the magnitude of said rate of change in said actual pressure of ignition over said successive interval of time to the magnitude of a reference pressure rate of change value;

comparing the magnitude of said rate of change in said actual rotational speed over said successive interval of time to the magnitude of a reference speed rate of change value; and closing said fuel valve in response to the magnitude of said reference pressure rate of change value being greater than the rate of change of said actual pressure of ignition over said successive interval of time, in the presence of the magnitude of said rate of change of actual rotational speed over said successive interval of time being less than the magnitude of said reference speed rate of change value; thereby stopping said fuel flow to said burner.

5. The method of claim 4, wherein the step of closing said fuel valve further comprises the step of:

determining prior to closing said fuel valve that the magnitude of said reference pressure rate of change value is greater than the magnitude of the rate of change of said actual pressure of ignition over a subsequent interval of time.

6. An engine control for detecting burner blowout in a gas turbine power plant of the type including a gas turbine engine having a burner receiving a fuel flow and compressed air, the burner for providing ignition of said fuel flow to produce an actual pressure of ignition and a jet exhaust driving a rotatable generator shaft, said gas turbine engine having a pressure sensor for providing a sensed pressure signal indicative of the actual pressure of ignition, the fuel flow being provided to the burner through a fuel valve when the valve is in an open position, the generator shaft being connected to a generator, the generator shaft having an actual rotational speed, and the power plant having a speed sensor for providing a sensed speed signal indicative of the actual rotational speed of said generator shaft in response to the presence of said jet exhaust; wherein said engine control comprises:

memory means for storing a reference pressure rate of change signal and a reference speed rate of change signal; and signal processing means for storing a plurality of signals representative of a blowout detection algorithm, said signal processing means being responsive to said sensed speed signal and to said sensed pressure signal to provide a pressure derivative signal indicative of the rate of change in said sensed pressure signal over a successive interval of time;

a speed derivative signal indicative of the rate of change in said sensed speed signal over said successive interval of time; and a command signal to said fuel valve closing said fuel valve in response to the magnitude of said reference pressure rate of change signal being greater than the magnitude of said pressure derivative signal in the presence of the magnitude of the speed derivative signal being less than the magnitude of said reference speed rate of change signal; thereby stopping said fuel flow to said burner.

7. The engine control of claim 6, wherein the power plant further comprises:

a power turbine interposed between the gas turbine engine and the generator, said power turbine having a rotatable turbine shaft adapted to fixedly engage the generated shaft, the jet exhaust propelling said power turbine, said power turbine driving the generator through the power turbine shaft and said generator shaft.

8. The apparatus of claim 6, wherein the engine control further provides:

said command signal if the magnitude of said reference pressure rate of change signal is greater than the magnitude of the pressure derivative over a subsequent interval of time.

9. The engine control of claim 8, wherein the power plant further comprises:

a power turbine interposed between the gas turbine engine and the generator, said power turbine having a rotatable turbine shaft adapted to fixedly engage the generator shaft, the jet exhaust propelling said power turbine, said power turbine driving the generator through the power turbine shaft and said generator shaft.

10. An assembly for use with a generator, having a rotatable generator shaft, said generator for providing electrical energy in response to rotation of said generator shaft, wherein said assembly comprises:

a power turbine, having a rotatable turbine shaft adapted to fixedly engage said generator shaft, and having a speed sensor for providing a sensed speed signal indicative of the actual rotational speed of said turbine shaft in response to the presence of a jet exhaust;

a gas turbine engine, having a compressor for compressing inlet air to provide a compressed air stream, a burner for receiving a fuel flow and said compressed air stream and for providing ignition of said fuel flow to produce said jet exhaust, said gas turbine engine having a pressure sensor for providing a sensed pressure signal indicative of the actual pressure of said ignition;

a fuel system, having a fuel valve for metering said fuel flow to said burner, said valve operating between an open and a closed position, said fuel system further including an actuator for controlling the position of said fuel valve in response to a command signal; and an engine control, having memory means for storing a reference pressure rate of change signal and a reference speed rate of change signal, and including signal processing means for storing a plurality of signals representative of a blowout detection algorithm, said signal processing means being responsive to said sensed speed signal and to said sensed pressure signal to provide:

a pressure derivative signal indicative of the rate of change in said sensed pressure signal over a successive interval of time, a speed derivative signal indicative of the rate of change in said sensed speed signal over said successive interval of time, and said command signal to said actuator in response to the magnitude of said reference pressure rate of change signal being greater than the magnitude of said pressure derivative signal in the presence of the magnitude of said speed derivative signal being less than the magnitude of said reference speed rate of change signal; thereby causing said actuator to close said fuel valve and to stop said fuel flow to said burner.

11. The assembly of claim 10, wherein the engine control further provides:

said command signal if the magnitude of said reference pressure rate of change signal is greater than the magnitude of the pressure derivative over a subsequent interval of time.

12. The assembly of claim 10, wherein the gas turbine engine further comprises:

said compressor having a low pressure compressor and a high pressure compressor; and a gas turbine having a low pressure turbine connected to said low pressure compressor and a high pressure turbine connected to said high pressure compressor.

13. A gas turbine power plant, of the type for providing electricity, wherein said gas turbine power plant comprises:

a generator, having a rotatable generator shaft having an actual rotational speed, said generator shaft rotating in response to the presence of a jet exhaust, said generator for providing electrical energy in response to rotation of said generator shaft;

a speed sensor for providing a sensed speed signal indicative of said actual rotational speed;

a gas turbine engine, having a compressor for compressing inlet air to provide a compressed air stream, a burner for receiving a fuel flow and said compressed air stream and for providing ignition of said fuel flow to produce said jet exhaust, said gas turbine engine having a pressure sensor for providing a sensed pressure signal indicative of the actual pressure of ignition;

a fuel system, having a fuel valve for metering said fuel flow to said burner, said valve operating between an open and a closed position, said fuel system further including an actuator for controlling the position of said fuel valve in response to a command signal; and an engine control, having memory means for storing a reference pressure rate of change signal and a reference speed rate of change signal, and including a signal processing means for storing a plurality of signals representative of a blowout detection algorithm, said signal processing means being responsive to said sensed speed signal and to said sensed pressure signal to provide:

a pressure derivative signal indicative of the rate of change in said sensed pressure signal over a successive interval of time, a speed derivative signal indicative of the rate of change in said sensed speed signal over said successive interval of time, and said command signal to said actuator in response to the magnitude of said reference pressure rate of change signal being greater than the magnitude of said pressure derivative signal, in the presence of the magnitude of said speed derivative signal being less than the magnitude of said reference speed rate of change signal; thereby causing said actuator to close said fuel valve and to stop said fuel flow to said burner.

14. The power plant of claim 13, wherein the engine control further provides: said command signal if the magnitude of said reference pressure rate of change signal is greater than the magnitude of the pressure derivative over a subsequent interval of time.

15. The power plant of claim 14, wherein the power plant further comprises:

a power turbine interposed between the gas turbine engine and the generator, said power turbine having a rotatable turbine shaft adapted to fixedly engage the generator shaft, the jet exhaust propelling said power turbine, said power turbine driving the generator through the power turbine shaft and said generator shaft.

16. The power plant of claim 15, wherein the gas turbine engine further comprises:

said compressor having a low pressure compressor and a high pressure compressor; and a gas turbine having a low pressure turbine connected to said low pressure compressor and a high pressure turbine connected to said high pressure compressor.

17. The power plant of claim 13, wherein the power plant further comprises:

a power turbine interposed between the gas turbine engine and the generator, said power turbine having a rotatable turbine shaft adapted to fixedly engage the generator shaft, the jet exhaust propelling said power turbine, said power turbine driving the generator through the power turbine shaft and said generator shaft.

18. The power plant of claim 13, wherein the gas turbine engine further comprises:

said compressor having a low pressure compressor and a high pressure compressor; and a gas turbine having a low pressure turbine connected to said low pressure compressor and a high pressure turbine connected to said high pressure compressor.

* * * * *